United States Patent
Moen

(10) Patent No.: US 7,677,090 B2
(45) Date of Patent: Mar. 16, 2010

(54) METHOD AND DEVICE FOR DETERMINING THE OCCURRENCE OF ROTATING STALL IN A COMPRESSOR'S TURBINE BLADE II

(75) Inventor: Lyder Moen, Tananger (NO)

(73) Assignee: Dynatrend AS (NO)

( * ) Notice: Subject to any disclaimer, the term of this patent is extended or adjusted under 35 U.S.C. 154(b) by 51 days.

(21) Appl. No.: 12/162,270

(22) PCT Filed: Jan. 24, 2007

(86) PCT No.: PCT/NO2007/000026

§ 371 (c)(1),
(2), (4) Date: Jul. 25, 2008

(87) PCT Pub. No.: WO2007/086755

PCT Pub. Date: Aug. 2, 2007

(65) Prior Publication Data

US 2009/0019925 A1    Jan. 22, 2009

(30) Foreign Application Priority Data

Jan. 26, 2006 (NO) .................................. 20060441

(51) Int. Cl.
*G01M 15/14* (2006.01)
(52) U.S. Cl. ................................. 73/112.06; 73/112.01
(58) Field of Classification Search ............... 73/112.05, 73/112.06
See application file for complete search history.

(56) References Cited

U.S. PATENT DOCUMENTS 3,245,219 A    4/1966   Warden et al
4,543,830 A    10/1985   Stephens (Continued)

FOREIGN PATENT DOCUMENTS

EP    0 465 696 A1    1/1992

(Continued)

OTHER PUBLICATIONS

Thuyen Le et al "Rotating Stall Analysis Using Signal-Adapted Filter Bank and Cohen's Time-Frequency Distributions", Proceedings, ISCAS 2000—IEEE International Symposium on Circuits and Systems, May 28-31, 2000, Geneva, Switzerland, vol. 1, pp. 603-606.

(Continued)

*Primary Examiner*—Lisa M Caputo
*Assistant Examiner*—Freddie Kirkland, III
(74) *Attorney, Agent, or Firm*—Andrus, Sceales, Starke & Sawall, LLP

(57) ABSTRACT

A method and device for determining the occurrence of rotating stall in the turbine blade of a compressor, in which the blade pass frequency of at least one compressor stage and the associated vibration energy are monitored, the normal blade pass frequency being constituted by the operating speed of rotation of the compressor multiplied by the number of turbine blades in the stage, and in which incipient rotating stall in a compressor stage is indicated when, at the normal blade pass frequency of the compressor stage, the vibration energy falls below a predetermined first value at the same time as, at a blade pass frequency above the normal blade pass frequency, the vibration energy rises above a predetermined second value.

8 Claims, 2 Drawing Sheets

U.S. PATENT DOCUMENTS

| | | |
|---|---|---|
| 4,996,880 A | 3/1991 | Leon et al. |
| 5,097,711 A | 3/1992 | Rozelle et al. |
| 6,857,845 B2 * | 2/2005 | Stabley et al. ................... 415/1 |
| 7,003,426 B2 * | 2/2006 | Bonanni et al. ............. 702/138 |
| 7,065,471 B2 * | 6/2006 | Gotoh et al. ................ 702/183 |
| 7,424,823 B2 * | 9/2008 | Teolis et al. .............. 73/112.01 |
| 7,580,802 B2 * | 8/2009 | Moen .......................... 702/56 |
| 2002/0162394 A1 | 11/2002 | Loftus et al. |
| 2006/0074568 A1 * | 4/2006 | Moen .......................... 702/42 |

FOREIGN PATENT DOCUMENTS

| | | |
|---|---|---|
| GB | 2318873 A | 5/1998 |
| NO | 320915 B1 | 2/2006 |
| WO | 2004/012155 A1 | 2/2004 |

OTHER PUBLICATIONS

International Search Report for parent application PCT/NO2007/000026, having a mailing date of May 9, 2007.

* cited by examiner

METHOD AND DEVICE FOR DETERMINING THE OCCURRENCE OF ROTATING STALL IN A COMPRESSOR'S TURBINE BLADE II

CROSS-REFERENCE TO RELATED APPLICATIONS

This application is the U.S. national stage application of International Application No. PCT/NO2007/000026, filed Jan. 24, 2007, which International application was published on Aug. 2, 2007, as International Publication No. WO 2007/086755 A1 in the English language, which application is incorporated herein by reference. The International application claims priority of Norwegian Patent Application No. 20060441, filed Jan. 26, 2006, which application is incorporated herein by reference.

BACKGROUND

This invention relates to a method for determining when rotating stall occurs in a turbine blade of a compressor. More particularly, it concerns a method for determining when the turbine blade is subjected to an undesired operating state in the form of so-called "rotating stall", in which the blade pass frequency of at least one compressor stage and the associated vibration energy are monitored, the normal blade pass frequency being constituted by the operating speed of rotation of the compressor multiplied by the number of blades of the stage. Incipient rotating stall in a compressor stage is indicated when, at the normal blade pass frequency of the compressor stage, the vibration energy falls below a predetermined value at the same time as, at a blade pass frequency above the normal blade pass frequency, the vibration energy rises above a predetermined value. Rotating stall in a compressor stage is indicated when, at the blade pass frequency above the normal blade pass frequency in the compressor stage, the vibration energy falls below a predetermined value at the same time as, at a blade pass frequency below the normal blade pass frequency, the vibration energy rises above a predetermined value. The invention also relates to a device for the implementation of the invention.

By the operational state of a turbine blade is meant in this context the type of load that the turbine blade is subjected to. The operational state may be, for example, normal operation, rotating stall etc.

During the operation of an axial compressor the following unfavourable forms of flow may occur, among other things:

Incipient rotating stall which is an intermediate phase, in which some of the turbine blades are about to lose some lift because of excessive underpressure, which leads to a tendency towards instability in the airflow. The cause of incipient rotating stall may be that the air approaches the turbine blade at the wrong angle. This may cause the flow to separate at the boundary layer between the turbine blade and air (boundary separation), whereby a varying flow is generated at one or more locations along the periphery of the stage.

Rotating stall occurs when a first turbine blade is subjected to the condition mentioned and the airflow is deflected towards an adjacent turbine blade which is overloaded while the other adjacent turbine blade is relieved. This causes the overloaded turbine blade to be subjected to stall, whereby the first turbine blade is relieved. Thus, a rotating stall propagates along the periphery of the stage at a speed of approximately half the speed of rotation of the turbine. In rotating stall a segment of the line of turbine blades in the compressor has too low pressure across the blades, but not all the turbine blades in the line of turbine blades lose their lift. This contributes to a great cyclical load on the blades, which entails great fatigue loading and, thereby an increased risk of rupture.

When so-called "stall" occurs, the segment of reduced air pressure has propagated to the entire line of turbine blades, which then loses the lift and thereby the ability to pump gas across the stage.

Surge occurs when one or more stages are in a state of stall and cannot transport gas from one stage to the other. Then a back and forward flow of air normally occurs in the compressor. This flow is caused by the turbine blades alternatingly establishing flow but losing it an instant later. As long as the air does not flow through the compressor and is not replaced, heat builds up in the air. The temperature quickly becomes very high, and will normally overheat affected components inside the compressor and at worst melt down turbine blades and seals.

For reasons of maintenance it is important to be able to estimate the remaining lifetime of the turbine blades. Early methods of estimation were based exclusively on operating time, the lifetime of a turbine blade, for example, being set to an operating time, during which, with reasonable certainty, satisfactory functioning could be expected regardless of the load the turbine blade was subjected to during the operating time.

Obviously, such relatively simple lifetime estimation led to excessively frequent maintenance intervals and consequently also replacement of turbine blades which had been subjected to relatively low strains during their operating time. Prior art now comprises lifetime estimation methods that are to some extent quite complicated, in which, in addition to operating time, parameters such as power loading, failures in both the component monitored and adjacent components, wear, and also faults in the measuring equipment used to measure the loads, are taken into account.

Rotating stall in a multi-stage axial compressor may result in overloading of the turbine blade with subsequent damage and compressor breakdown, without the condition being detectable by means of prior art equipment and methods.

According to the prior art a compressor is monitored by means of performance measurements. The measured values resulting from the measuring form part of the input values in a lifetime estimation computer program. The measurements are compared with anticipated values, the anticipated lifetime of the component in question or the entire turbine being affected by whether the measured value is greater or smaller than an anticipated value. However, this form of monitoring is not designed to allow determination of which compressor stage is being subjected to stall.

Norwegian patent application 20023609 discloses a method for detecting rotating stall. The method according to this application does not take into account new knowledge which has emerged during further development work.

Other methods for monitoring turbine blades are also known. U.S. Pat. No. 5,097,711 discloses a system for monitoring vibrations in covered turbine blades by means of eddy current induction in the covers of the turbine blades. The method is unsuitable for uncovered turbine blades.

EP 465696 describes a method of monitoring turbine blades by means of resonant frequencies. A differential Doppler signal is used, obtained by measuring at least at two different angular velocities.

GB 2318873 discloses a method for measuring vibrations in turbine blades, in which a pressure sensor is used on the inside of the turbine casing and a strain gauge which is mounted on the rotor blade 4. This method cannot be used in normal operation of a turbine, but only during testing, because the strain gauge and adjacent measuring equipment will not be able to resist the temperatures that may occur. Of these, only NO 20023609 addresses the discovery of rotating stall.

SUMMARY

The invention has as its object to remedy the drawbacks of the prior art.

The object is achieved according to the invention through the characteristics given in the description below and in the subsequent Claims.

To be able to determine when rotating stall occurs in the turbine blades of a compressor, in which the blade pass frequency of at least one compressor stage and the associated vibration energy are monitored, and in which the normal blade pass frequency is constituted by the operating speed of rotation of the compressor multiplied by the number of turbine blades in the stage, incipient rotating stall in a compressor stage is indicated when, at the normal blade pass frequency in the compressor stage, the vibration energy falls below a predetermined first value at the same time as, at a blade pass frequency above the normal blade pass frequency, the vibration energy rises above a predetermined second value.

Rotating stall in a compressor stage is indicated when, at the blade pass frequency above the normal blade pass frequency in the compressor stage, the vibration energy falls below a predetermined second value at the same time as, at a blade pass frequency below the normal blade pass frequency, the vibration energy rises above a predetermined third value.

The blade pass frequency and associated vibration energy may be measured by means of a microphone placed at the air inlet of the compressor or externally at the casing of the compressor. It has also turned out that a vibration-sensitive sensor, for example in the form of an accelerometer, which is mounted externally on the compressor casing at or relatively close to the compressor stage(s) to be monitored, outputs reliable and good measured values.

Even though, in principle, the normal blade pass frequency is a fixed value, a limited frequency range around the normal blade pass frequency is perceived as the normal operating range. This is due to, among other things, load variations in and the "rigidity" of the compressor control system. The same applies also to the frequencies above and below the normal blade pass frequency, at which incipient and developed rotating stalls are determined.

The microphone and sensor pick up acoustically generated pressure waves from the turbine blades by pressure waves propagating through the air. The sensor picks up vibrations in the compressor casing generated by said pressure waves.

The measurement signal from the microphone and sensor is processed, for example by means of so-called "Fast Fourier Transform" (FFT) and other signal processing filters known per se, in which the measurement signal is converted into measured values corresponding to the frequencies at which they occur.

The measured values are then analyzed in a logic circuit to determine whether the operational state of the compressor blades of the compressor stage is normal, is at incipient rotating stall, or whether rotating stall has developed.

The logic circuit outputs a signal which indicates normal operating state if, at the normal blade pass frequency, the vibration energy is above the predetermined first value. Incipient rotating stall is indicated if, at the normal blade pass frequency in a compressor stage, the vibration energy falls below the predetermined first value at the same time as, at a blade pass frequency above the normal blade pass frequency, the vibration energy rises above a predetermined second value.

Rotating stall is indicated for the compressor stage in question when, at the blade pass frequency above the normal blade pass frequency, the vibration energy falls below the predetermined second value at the same time as, at a blade pass frequency below the normal blade pass frequency, the vibration energy rises above a predetermined third value.

A signal from the logic circuit indicating the presence of incipient or full rotating stall, can be used in the control system of the compressor, for example to reduce the back pressure of the compressor in order, thereby, to re-establish a normal airflow through the compressor.

The same signal can be input to the lifetime estimation program mentioned in the introduction of the application, for the compressor stage in question.

BRIEF DESCRIPTION OF THE DRAWINGS

In what follows is described a non-limiting example of a preferred method and device which are visualized in the accompanying drawings, in which.

DETAILED DESCRIPTION OF THE DRAWINGS

Figure 1:
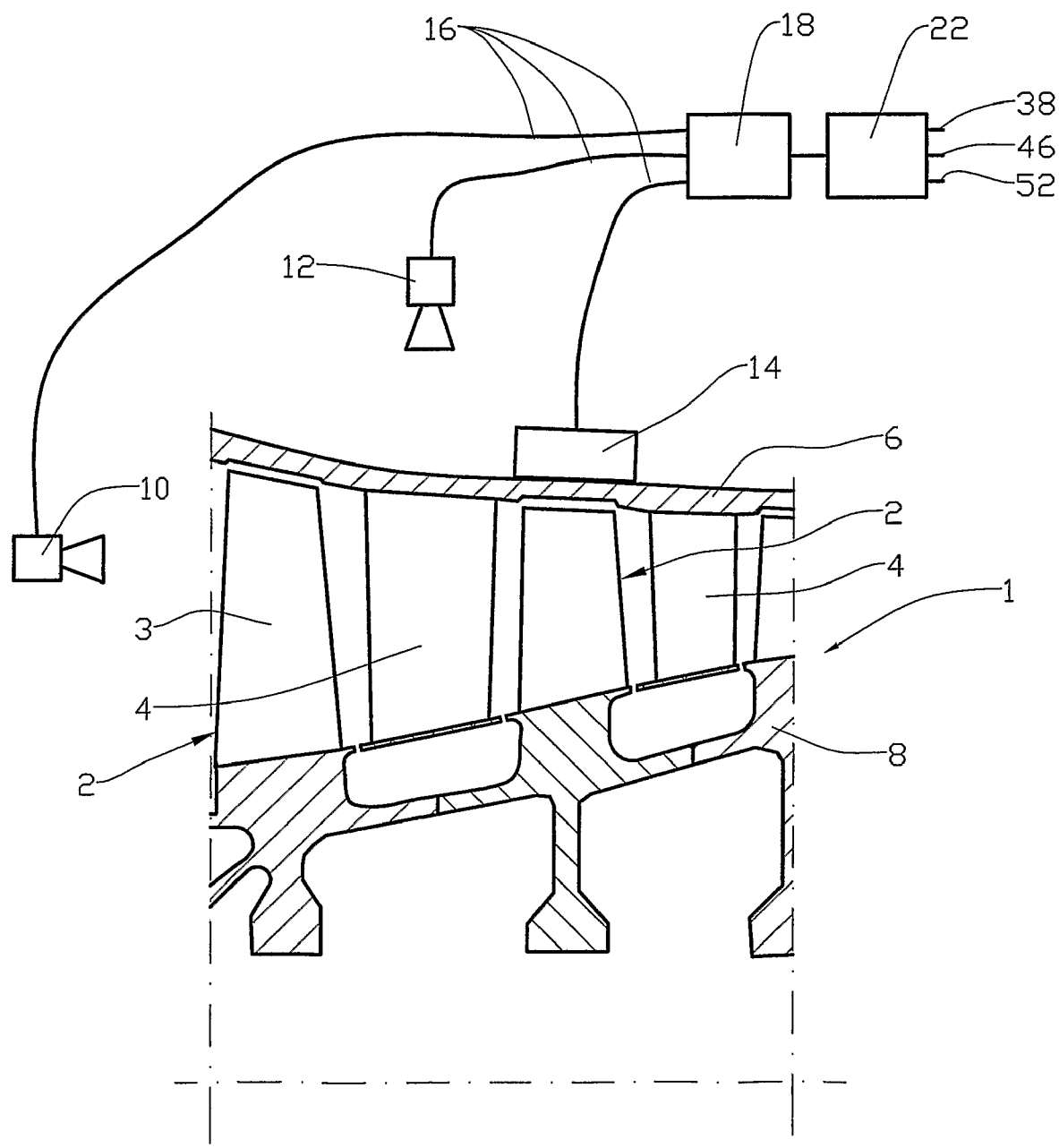
FIG. 1 shows schematically an axial section through a compressor.

In the drawings the reference numeral 1 identifies a section of an axial compressor comprising several compressor stages 2 with turbine blades 3 and associated stator stages 4, compressor casing 6 and rotor 8.

A first microphone 10 is placed outside the air inlet of the compressor 1, whereas a second microphone 12 is placed outside the compressor housing 6 near the compressor stages 2 to be monitored. A vibration-sensitive sensor 14 is mounted on the compressor casing 6 near the compressor stage to be monitored.

The microphones 10, 12 and the sensor 14 are connected via respective lines 16 to a signal processing device 18 of an embodiment known per se, in which the signals from said instruments 10, 12 and 14 are processed.

Figure 2:
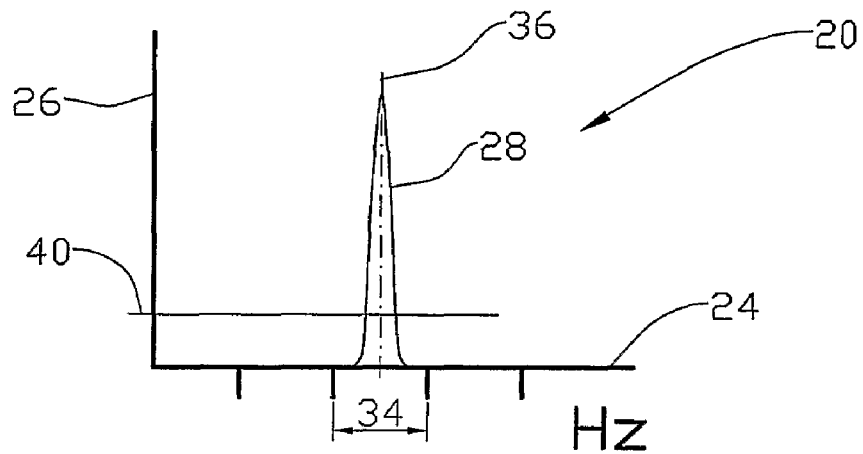
FIG. 2 shows a simplified diagram, in which the measured values indicate normal operation.
Figure 3:
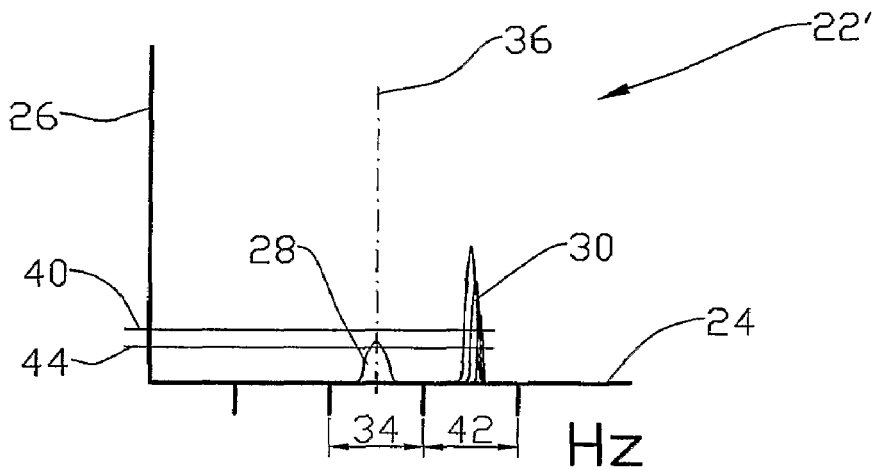
FIG. 3 shows a simplified diagram, in which the measured values indicate incipient rotating stall.
Figure 4:
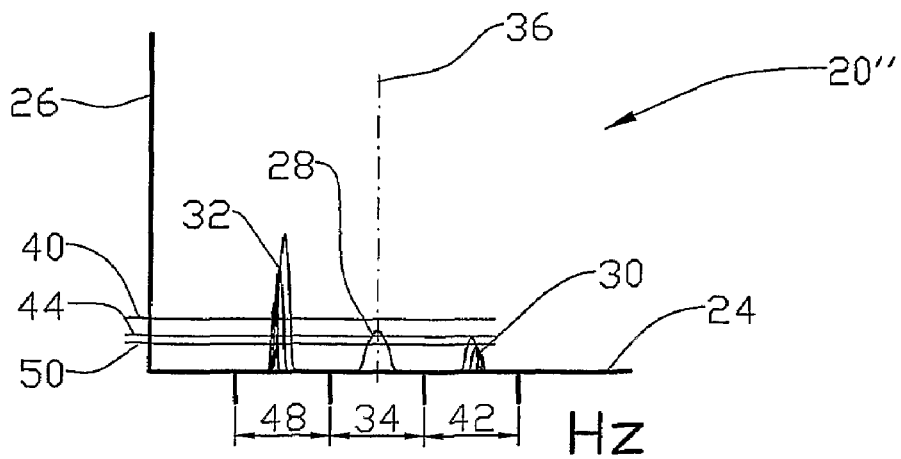
FIG. 4 shows a simplified diagram, in which the measured values indicate rotating stall.

After the signals have been processed, they can be presented graphically as a diagram 20, 20', 20", see FIGS. 2 to 4, for example on a screen, not shown.

The signal processing device 18 passes the processed signals on to a logic unit 22, in which the signals are compared with the limits of a predetermined blade pass frequency and associated vibration energy limits.

The frequency range in question is distributed along the abscissa 24 of the diagrams 20, 20', 20", whereas the ordinate 26 of the diagrams 20, 20' and 20" indicate measured values. The processed signal is displayed as vibration energy curves 28, 30 and 32.

If the measured values processed by the signal processing device 18, represented by the curve 28 in FIG. 2, are within a frequency range 34 around a normal blade pass frequency 36, the measured values are interpreted as being normal by the logic unit 22, which shows this by connecting a voltage to a first output 38.

Were a situation to occur in the compressor stage 2 in question, as shown by the curves 28 and 30 in FIG. 3, in which the energy level of the curve 28 is reduced to a level which is lower than a predetermined first value 40, at the same time as the curve 30 in a frequency range 42 which is higher than the frequency range 34, exceeds a predetermined second value 44, the measured values are interpreted by the logic unit 22 as an incipient rotating stall being present. The logic unit 22 shows this by connecting a voltage to a second output 46.

If a situation in the compressor stage 2 in question is reflected by the curves 30 and 32 in FIG. 3, in which the energy level of the curve 30 is reduced to a level which is lower than the predetermined second value 42, at the same time as the curve 32 in a frequency range 48 which is lower than the frequency range 34, exceeds a predetermined third value 50, the measured values are interpreted by the logic unit 22 as a full rotating stall being present. The logic unit 22 shows this by connecting a voltage to a third output 52.

The abscissa of the diagram 20 may be divided into as many frequency ranges as desirable, with individual limit values for each range. Typically, compressor stages with different numbers of turbine vanes have separate frequency ranges.

The predetermined limit values 40, 44 and 50 may be different for rising energy levels and falling energy levels, respectively.

The curves 30 and 32 may be formed by curves which are somewhat offset relative to each other with respect to frequencies.

The invention claimed is:

1. A method for determining when incipient rotating stall occurs in the turbine blade of a compressor, in which the blade pass frequency of at least one compressor stage and the associated vibration energy are monitored, the normal blade pass frequency being constituted by the operating speed of rotation of the compressor multiplied by the number of turbine blades in the stage, wherein incipient rotating stall in a compressor stage is indicated when, at the normal blade pass frequency of the compressor stage, the vibration energy falls below a predetermined first value at the same time as, at a blade pass frequency above the normal blade pass frequency, the vibration energy rises above a predetermined second value.

2. The method in accordance with claim 1, wherein rotating stall in a compressor stage is indicated when, at the blade pass frequency above the normal blade pass frequency of the compressor stage, the vibration energy falls below a predetermined second value at the same time as, at a blade pass frequency below the normal blade pass frequency, the vibration energy rises above a predetermined third value.

3. The method in accordance with claim 2, wherein the blade pass frequency and associated vibration energy are measured by means of a first microphone which is placed at an air inlet of the compressor.

4. The method in accordance with claim 2, wherein the blade pass frequency and associated vibration energy are measured by means of a second microphone which is placed outside a casing of the compressor.

5. The method in accordance with claim 2, wherein the blade pass frequency and associated vibration energy are measured by means of a vibration-sensitive sensor which is placed on a casing of the compressor at the compressor stage in question.

6. The method in accordance with claim 1, wherein the blade pass frequency and associated vibration energy are measured by means of a first microphone which is placed at an air inlet of the compressor.

7. The method in accordance with claim 1, wherein the blade pass frequency and associated vibration energy are measured by means of a second microphone which is placed outside a casing of the compressor.

8. The method in accordance with claim 1, wherein the blade pass frequency and associated vibration energy are measured by means of a vibration-sensitive sensor which is placed on a casing of the compressor at the compressor stage in question.

* * * * *